United States Patent [19]

Highstone, deceased et al.

[11] E Re. 28,692

[45] Reissued Jan. 20, 1976

[54] MONITORING APPARATUS AND METHOD FOR ELECTRICAL PROTECTION SYSTEMS

[75] Inventors: Raymond J. Highstone, deceased, late of Scottsdale, Ariz.; Manfred W. Muehter, Lanoka Harbor, N.J. by American District Telegraph Company, Jersey City, N.J.

[73] Assignee: American District Telegraph Company, New York, N.Y.

[22] Filed: Jan. 10, 1975

[21] Appl. No.: 540,147

Related U.S. Patent Documents

Reissue of:

[64] Patent No.: 3,401,384
Issued: Sept. 10, 1968
Appl. No.: 516,896
Filed: Dec. 28, 1965

[52] U.S. Cl. ..... 340/276; 340/409
[51] Int. Cl.[2] ..... G08B 13/22
[58] Field of Search ..... 340/276, 409

[56] References Cited

UNITED STATES PATENTS

| | | | |
|---|---|---|---|
| 2,249,891 | 7/1941 | Ekman et al. | 340/409 |
| 2,895,125 | 7/1959 | Watts | 340/227 R |
| 3,133,276 | 5/1964 | Miller et al. | 340/276 |
| 3,139,143 | 6/1964 | Renda | 169/19 |
| 3,252,156 | 5/1966 | Muehter | 340/276 |
| 3,254,334 | 5/1966 | Mitchell | 340/276 |

FOREIGN PATENTS OR APPLICATIONS

| | | |
|---|---|---|
| 447,265 | 3/1948 | Canada |
| 616,363 | 3/1961 | Canada |
| 758,263 | 5/1967 | Canada |

*Primary Examiner*—David L. Trafton
*Attorney, Agent, or Firm*—Charles B. Smith

EXEMPLARY CLAIM

1. Apparatus for increasing the security of an electrical protection system in which a protected location is conductively coupled to a central station which comprises at least two conductive means for coupling said protected location to said central station, at said central station, a first supervisory circuit and a second supervisory circuit, each supervisory circuit including a source of supervisory current coupled to a corresponding one of said conductive means and current-sensitive means coupled to said corresponding conductive means to detect predetermined changes in supervisory current therein, and at said protected location, a first protection circuit and a second protection curcuit respectively corresponding to said first and second supervisory circuits at said central station, wherein each protection circuit is provided with an input terminal, a shunt terminal and an output terminal, and wherein at least one of said protection circuits is provided with at least one detection device connected between said input terminal and said output terminal so that operation of said detection device alters the flow of supervisory current in said protection circuit, means for connecting the input terminal of each of said protection circuits to a corresponding one of said conductive means to couple each protection circuit to a corresponding supervisory circuit at said central station, so that supervisory current is directed to each protection circuit, a ground point, switching means interposed between said ground point and said output terminals of said first and second protection circuits, said switching means including:

first relay means and second relay means respectively corresponding to said first and second protection circuits, wherein each of said relay means is provided with a winding having first and second terminals, an armature, and a contact, means for connecting the second terminal of each relay means to said ground point, means for connecting the armature of each relay to the first terminal of the winding of the other relay, two first conductor means for connecting the output terminals of said first and second protection circuits to said respective first terminals of said windings of said correspondingly first and second relay means, and two second conductor means for connecting the shunt terminals of each of said first and second protection circuits to said contacts of said second and first relay means, respectively, wherein each of said shunt terminals is located in said respective first and second protection circuits at a point selected to shunt a predetermined portion of the respective protection circuit in response to the energizing of the relay means corresponding to the other protection circuit.

11 Claims, 2 Drawing Figures

MONITORING APPARATUS AND METHOD FOR ELECTRICAL PROTECTION SYSTEMS

Figure 1:
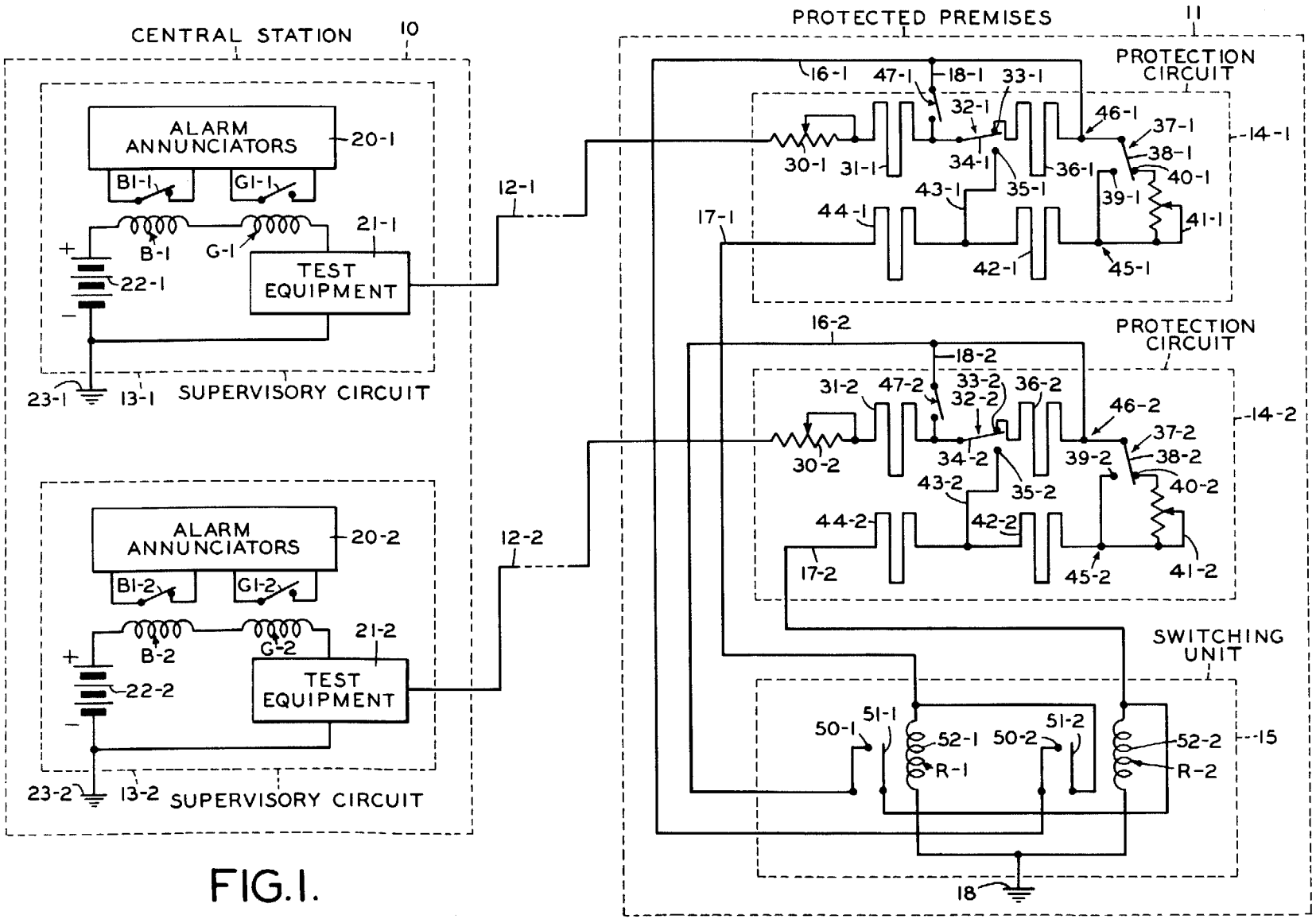

Matter enclosed in heavy brackets [ ] appears in the original patent but forms no part of this reissue specification; matter printed in italics indicates the additions made by reissue.

The present invention relates to electrical protection systems, and more particularly to electrical protection systems having apparatus for improving the security of such systems by detecting attempts to compromise the systems.

In direct wire central station burglar alarm systems a number of protected places such as factories, banks and mercantile establishments, are individually connected to a central station by means of separate lines or conductive paths, usually ordinary telephone lines leased for the purpose. Each of the protected premises is typically provided with a protection circuit including one or more devices which are arranged to detect the entry of an intruder into the protected premises by producing an electrical variation in the corresponding line which results in an alarm signal at the central station.

Direct wire central station burglar alarm systems are customarily designed to provide an alarm signal upon a departure of a predetermined magnitude from the normal value of a supervisory line current supplied from the central station through the corresponding conductive path to the protection circuit at the protected premises. Detection devices of various types are located at the protected premises and are so arranged as to break and/or ground the protection circuit upon being actuated by some activity of an intruder. The resulting decrease and/or increase in the normal supervisory current is detected by a so-called "drop" or supervisory circuit located at the central station which also serves to annunciate the alarm signal to the attendants at the central station.

In brief, the customary drop consists of a break detecting relay and a ground detecting relay connected in series with the line, the break relay responding to a predetermined decrease in line current and the ground relay responding to a predetermined increase in line current. Each relay is provided with suitable contacts and auxiliary circuitry to actuate visible and audible annunciators upon line current changes of sufficient magnitude to actuate the corresponding relay. Of course, suitable electronic circuitry may be used in place of the current-sensitive relays, an example of which is the solid state circuit described and claimed in the copending United States patent application of Manfred W. Muehter, Ser. No. 309,761, filed Sept. 18, 1963.

While difficult, it is at least theoretically possible for a skilled and knowledgeable intruder to compromise such burglar alarm systems by tampering with [thhe] *the* protection circuit. For example, if the transmission lines could be bridged external to the protected premises through a device having approximately the characteristics of the electrical load represented by the detection apparatus comprising the internal protection circuit, an entry could be then effected to the premises without producing an alarm signal at the central station. Under such circumstances, the device acts as a dummy load which, if it can be substituted undetected for the internal protection circuit, will permit disconnection of the actual detection apparatus from the circuit. The dummy load must obviously electrically resemble the internal circuit closely enough so that the line current will not be changed sufficiently to actuate either the break or ground relays in the central station drop.

Alternatively, it is also theoretically possible under certain conditions to ground the transmission line between the central station and the protected premises thereby negativing the effect produced upon the protection circuit by the operation of the detection devices at the protected premises. Usually this would be of significance under daytime conditions, and would be of concern particularly in connection with holdup alarms.

In the present invention, attempts to compromise an electrical protection system are immediately detected at the central station by providing at the protected premises at least two protection circuits which are interconnected so that a compromise attempt on one protection circuit will cause the other protection circuit to produce an alarm signal at the central station. The two protection circuits are interconnected at the protected premises by means of a pair of switching devices respectively interposed between each of the two circuits and the local ground connection, and each of the two protection circuits is connected to a separate supervisory circuit at the central station via a separate supervisory signal path. The two switching devices are arranged so that an attempt to compromise either one of the protection circuits which results in the operation of the corresponding switching device will shunt a portion of the other protection circuit, thereby increasing the normal supervisory signal current in the second circuit by an amount sufficient to produce to an alarm signal in the corresponding supervisory circuit at the central station.

Apart from the detection of attempted tampering with protection circuits, the present invention also provides useful advance warning of impending electrical troubles in the two protection circuits provided at the protected premises. For instance, slowly deteriorating insulation tends to cause increasing line leakage, and if the leakage in one of the protection circuits reaches a point sufficient to cause operation of the corresponding switching device, then a portion of the other protection circuit is shunted thereby operating the ground relay in the drop at the central station. Similarly, increasing circuit resistance, indicative of dirty or corroded terminals and contacts, in one of the protection circuits may also be detected at the central station by the supervisory circuit of the other protection circuit. The line may then be repaired while still serviceable instead of passing unnoticed to the alarm level at which time the line would be out of service until repairs could be effectuated.

Those skilled in the art will immediately recognize from the following description and appended drawings that the principles of the present invention may be applied with advantage to various types of electrical protection systems and to other electrical systems designed for the transmission of data over extended lines. However, as it is anticipated that the invention will find most immediate utility in central station direct wire burglar alarm systems, the invention will be described in terms of its application thereto. The description is intended for illustrative purposes only and in no manner to limit the invention.

Figure 2:
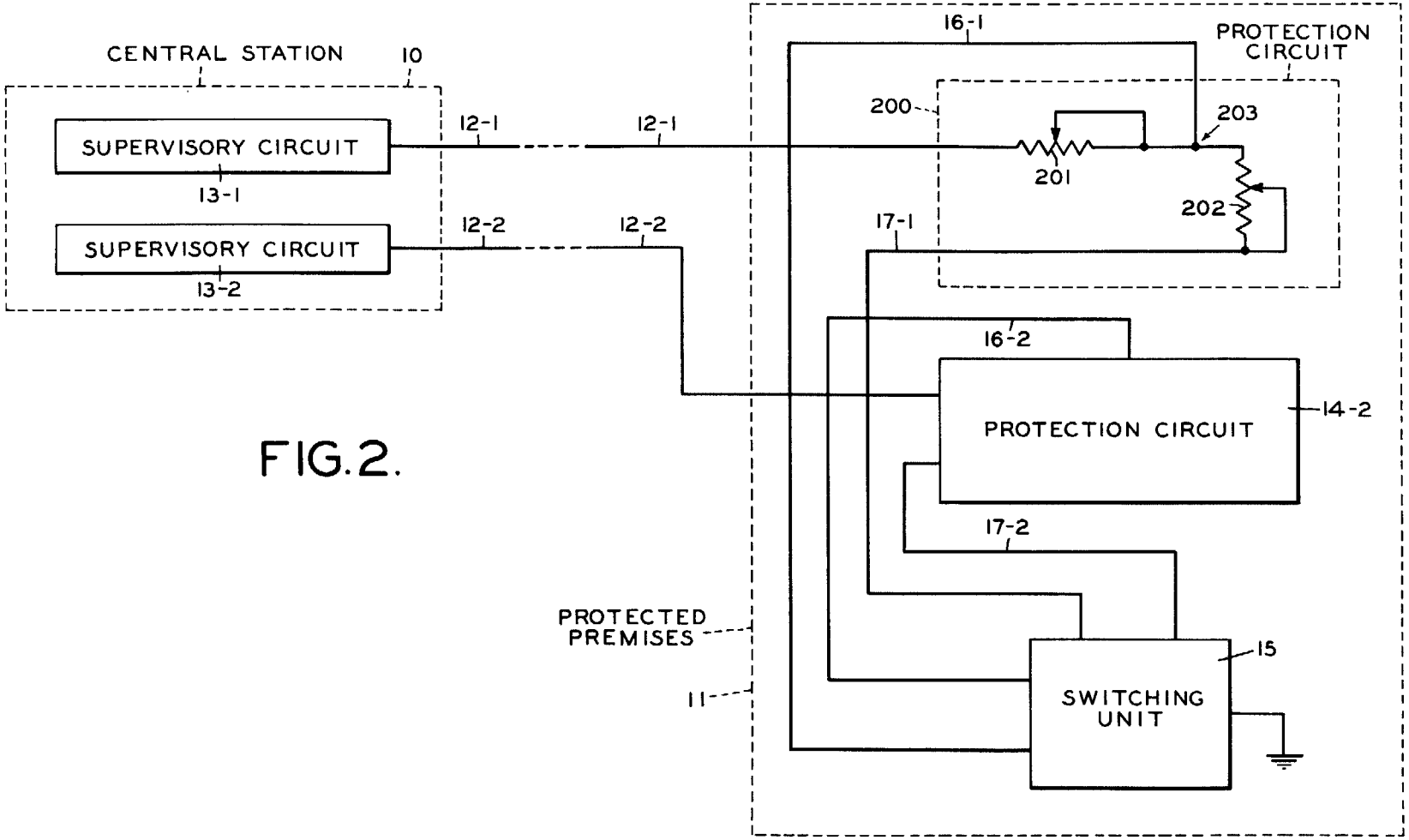

The invention will now be described in greater detail which reference to the appended drawings, in which:

FIG. 1 is a schematic wiring diagram of a direct wire burglar alarm system embodying the basic principles of the invention and illustrating an installation where detection devices are divided between two protection circuits; and FIG. 2 is a schematic wiring diagram of a direct wire burglar alarm system embodying the principles of the invention and especially adapted for locations where it is not desired to divide the detection devices between two protection circuits.

FIGURE 1

Referring now to FIG. 1, two supervisory circuits 13-1 and 13-2 at a central station 10 are shown connected to a protect premises 11 by two separate signal paths 12-1 and 12-2, each of which may be a telephone line or similar direct wire connection. The return may be by separate wire connection or, as shown, by ground return. Typically, the lines 12-1 and 12-2 may be as much as twenty miles in length and may pass through several telephone exchanges (not shown). At the protected premises 11, the lines 12-1 and 12-2 are connected to the input points of corresponding local protection circuits 14-1 and 14-2, each circuit including conventional detection devices which produce break and/or ground signals, and thence via the output points of circuits 14-1 and 14-2 through conductors 17-1, 17-2 and switching unit 15 to ground point 18. For convenience of description, local protection circuits 14-1 and 14-2 have been shown as identical in construction, although it is to be understood that in general the two circuits will include different arrangements of detecting devices. Thus local protection circuit 14- 1 is illustrated in highly simplified form as comprising the series connection of a current adjusting resistor 30-1, a foil circuit 31-1, armature 34-1 and back contact 33-1 of a protection control switch 32-1, another foil circuit 36-1, armature 38-1 and back contact 40-1 of a door protection switch 37-1, a current adjusting resistor 41-1, foil circuits 42-1 and 44-1, and thence to ground at 18 via switching unit 15. The door protection switch 37-1 has a front contact 39-1 connected to foil circuit 42-1 at point 45-1, and the protection control switch 32-1 has a front contact 35-1, which, when made with armature 34-1, provides a shunt through conductor 43-1 to a point between foil circuits 42-1 and 44-1 for all circuit components 36-1, 37-1, 41-1, and 42-1.

Within circuit 14-1, the foil circuits 31-1, 36-1, 42-1, 44-1 may consist of conventional lead foil strip adhered to the glass panels of windows and doors and carry the normal supervisory current supplied from the corresponding supervisory circuit 13-1 at the central station 10. By way of example, if an intruder breaks a glass panel in an effort to enter the premises, the current carrying foil will be severed and thereby result in the production of a "break" alarm signal by the corresponding supervisory circuit 13-1 at the central station 10. Typically, such a break signal might be represented by a decrease in supervisory current in line 12-1 from a normal value of 15 milliamperes to 9 milliamperes or less. A similar form of protection for walls, floors and ceilings is sometimes provided by means of foil or fine wire applied to the surfaces thereof in such manner that it will be ruptured if the surface is breached. Items 31-1, 36-1, 42-1, 44-1 of the drawings are intended to represent this form of protection regardless of whether installed on glass panels or other building structure elements.

Also within circuit 14-1, if a door protected by the switch 37-1 is opened, the armature 38-1 will transfer from the back contact 40-1 to the front contact 39-1 and result in the production of a brief "break" alarm signal (while the armature 38-1 is in motion) followed by a "ground" alarm signal by circuit 13-1 at the central station 10. Typically, a ground signal might be represented by an increase in supervisory current in line 12-1 from the normal value to 21 milliamperes or more.

It should be understood that the actual protection circuits at the protected premises will usually be substantially more complex and sophisticated than the simple circuits shown and will include a far greater number of protective devices. It should also be understood that severing of one of the foil strips 31-2, 36-2, 42-2, 44-2 in protection circuit 14-2 will result in the production of a "break" alarm signal by corresponding supervisory circuit 13-2 at central station 10, and that opening of a door protected by switch 37-2 in protection circuit 14-2 will result in the production of a brief "break" alarm signal followed by a "ground" alarm signal by supervisory circuit 13-2 at central station.

The other end of line 12-1 is coupled within circuit 13-1 at the central station 10 to the positive terminal of a source of potential 22-1 (which typically might be a fifty-two volt battery) through a series circuit comprising test equipment 21-1, the winding of the ground relay G-1 and the winding of the break relay B-1. The negative terminal of the normal operation battery 22-1 is grounded at point 23-1. Test equipment 21-1 may comprise any one of a number of well known arrangements, for example, equipment 21-1 may be designed in accordance with the principles disclosed in the copending United States patent application of Lawrance H. Mitchell, Ser. No. 331,771, filed Dec. 19, 1963.

As previously indicated, each of the circuits at the protected premises will generally comprise a number of devices for the protection of doors, walls and windows. In the case of mercantile establishments particularly, it has been found convenient to shunt certain of the protective devices out of one or both of the circuits during normal business hours and thus avoid the production of alarm signals as the front door or various windows are opened in the ordinary course of business. The shunt feature is shown in the drawings as controlled in protection circuits 14-1 and 14-2 by the respective protection control switches 32-1 and 32-2 which are operated when the premises are opened for business so that armatures 34-1 and 34-2 make with front contacts 35-1 and 35-2 thereby connecting lines 12-1 and 12-2 to ground point 18 via elements 30-1, 31-1, 44-1, and 30-2, 31-2, 44-2, respectively, and removing protection devices 36-1, 37-1, 42-1 and 36-2, 37-2, 42-2 from the respective circuits. The devices 31-1, 44-1 and 31-2, 44-2 remaining in the respective protection circuits 14-1 and 14-2 ordinarily constitute the so-called "permanent" protection devices such as foil or wire protected walls, ceilings, etc.

Adjustable resistors 30-1, 41-1 and 30-2, 41-2 are provided in circuits 14-1 and 14-2 at the protected premises to limit the current in each of the lines 12-1 and 12-2 to a selected nominal value, e.g., fifteen milliamperes, during the period while the entire protection system is in operation, usually termed the "protection-on" or "night" period. The circuit components are so selected and adjusted that operation of a break signal detection device will cause the line current to fall to or below a first selected value, e.g., nine milliamperes, while operation of a ground signal detection device will cause the line current to rise to or above a second preselected valve, e.g., twenty-one milliamperes. During the "protection-off" or "day" period, the adjustments are such that the system is in the grounded condition. While specific values of currents and voltages are referred to herein for convenience in explaining the operation of the invention, it should be understood that these specific values are given by way of illustration only and are not to be construed as in any manner limiting the invention.

In supervisory circuit 13–1 at central station 10, the break relay B–1 is arranged to be held energized by the normal current in line 12–1, while the ground relay G–1 is [de-energizing] *de-energized* during the "protection-on" period. A decrease in the line current to or below the first selected value will cause the break relay B–1 to become de-energized and open the normally closed contacts B1–1, while an increase of line current to or above the second selected value will energize the ground relay G–1 and close the normally open contacts G1–1. The contacts B1–1 and G1–1 are coupled to alarm annunciators 20–1 which are of conventional design and serve to provide audible and visible indications of the operation of the break and ground relays, respectively, to the attendants at the central station. Operation of supervisory circuit 13–2 corresponding to protection circuit 14–2 is similar in all respects to the above-described operation of circuit 13–1.

The present invention improves the security of the system described above during the protection-on condition by providing an interconnection between circuits 14–1 and 14–2 in switching unit 15 so that operation of any device in either protection circuit which interrupts the supervisory current in one circuit for more than a predetermined time interval will not only cause an alarm signal to be produced by the corresponding supervisory circuit at the central station 10 but also cause an alarm signal to be produced by the other supervisory circuit at the central station 10. Referring to switching unit 15, conductor 17–1 from protection circuit 14–1 is connected to the input terminal of winding 52–1 of relay R1 so that relay R1 is energized by the flow of normal supervisory current to ground at 18 supplied from battery 22–1 in supervisory circuit 13–1. Contact 50–1 of relay R1 is connected to conductor 16–2 from protection circuit 14–2, and armature 51–1 of relay R1 is connected to the input terminal of winding 52''2 of relay R2. In the energized condition of relay R1, contact 50–1 is normally open so that conductor 16–2 is not connected to ground point 18 through winding 52–2 of relay R2, but in the de-energized condition of relay R1, armature 51–1 makes with contact 50–1 to provide a ground connection for conductor 16–2 via winding 52–2 of relay R2. It is therefore evident that by connecting conductor 16–2 to an appropiate point 46–2 in protection circuit 14–2, a decrease in the normal supervisory current flowing through protection circuit 14–1 to winding 52–1, which causes the current to fall to a level below that required to energize relay R1, will release relay R1 and thereby result in shunting a portion of protection circuit 14–2. Since shunting of a portion of protection circuit 14–2 causes the corresponding supervisory circuit 13–2 to produce an alarm signal, protection circuit 14–2 monitors protection circuit 14–1 to provide an indication of any decrease in supervisory current in circuit 14–1 which is sufficient to release relay R1, regardless of whether this decrease is accompanied by the generation of alarm signals in supervisory circuit 13–1 corresponding to protection circuit 14–1.

Relay R2 provides similar monitoring of protection circuit 14–2 by protection circuit 14–1 and supervisory circuit 13–1. Conductor 17–2 from protection circuit 14–2 is connected to ground point 18 by way of winding 52–2 of relay R2 so that relay R2 is energized by the flow of normal supervisory currents to ground at 18 from battery 22–2 in supervisory circuit 13–2. Contact 50–2 of relay R2 is connected to conductor 16–1 from protection circuit 14–1, and armature 51–2 of relay R2 is connected to the input terminal of winding 52–1 of relay R1. In the energized condition of relay R2, contact 50–2 is normally open so that conductor 16–1 is not connected to ground point 18 through winding 52–1 of relay R1, but in the de-energized condition of relay R2, armature 51–2 makes with contact 50–2 to provide a ground connection for conductor 16–1 via winding 52–1 of relay R1. It is therefore evident that by connecting conductor 16–1 to an appropriate point 46–1 in protection circuit 14–1, a decrease of sufficient magnitude in the supervisory current flowing through protection circuit 14–2 to winding 52–2 will release relay R2 and thereby result in shunting a portion of protection circuit 14–1. Since shunting of a portion of protection circuit 14–1 causes supervisory circuit 13–1 to produce an alarm signal, protection circuit 14–1 monitors protection circuit 14–2 to provide an indication of any decrease in supervisory current in circuit 14–2 which is sufficient to release relay R2, regardless of whether this decrease is accompanied by the generation of alarm signals in supervisory circuit 13–2.

The present invention therefore provides a complementary monitoring arrangement whereby attempts to defeat or compromise either one of two protection circuits at a protected premises will result in the production of an alarm signal by the other circuit. However, although the invention has been illustrated and described in terms of two protection circuits interconnected to provide complementary monitoring, it is to be understood that if desired more than two protection circuits may be provided at a protected premises, in which case it is to be further understood that more than two protection circuits may be interconnected in accordance with the principles of this invention to provide complementary monitoring of the type described.

FIGURE 2

Turning now to FIG. 2, this drawing illustrates an embodiment of the principles of this invention designed for premises in which it is either inconvenient or undesirable to divide the detection devices between two separate protection circuits. For example, in a location already provided with a protection circuit, it may be too expensive or too time consuming to divide the existing protection circuit into two circuits. In such a situation, complementary monitoring may be provided by an arrangement of the type shown in FIG. 2, where like reference numbers are used to identify components which are similar to those illustrated in FIG. 1.

In FIG. 2 the block labelled protection circuit 14–2 at protected premises 11 represents a circuit of the type hown by the like numbered circuit in FIG. 1, in which ircuit 14–2 typically includes a number of detection evices. Protection circuit 14–2 is provided with a irect wire connection 12–2 to corresponding supervi- ory circuit 13–2 at central station 10, and circuit 13–2 unctions in the manner previously described in con- ection with the similarly numbered circuit in FIG. 1. n addition to protection circuit 14–2, there is installed protection circuit 200 which as shown may include no etection devices such as foil, wire or door switches, ut only one or more current adjusting resistors 201 nd 202. Protection circuit 200 is provided with a di- ect wire connection 12–1 to corresponding supervi- ory circuit 13–1 at central station 10, circuit 13–1 unctioning in the same manner as supervisory circuit 3–1 in FIG. 1.

Switching unit 15, which may be identical with the milarly numbered component in FIG. 1, is connected protection circuit 200 and protection circuit 14–2 by onductors 16–1, 17–1 and 16–2, 17–2, respectively. In his manner, a sufficient decrease in the supervisory urrent flowing through either protection circuit 200 or rotection circuit 14–2 will release the corresponding elay in circuit 15, thereby to shunt a portion of the ther protection circuit and produce an alarm signal at entral station 10 by the supervisory circuit corre- onding to the shunted circuit. As shown in FIG. 2, the onductor 16–1 is connected to protection circuit 200 t point 203 to shunt resistor 202.

In FIG. 1 the connection of the shunting conductors 6–1 and 16–2 to the respective protection circuits 4–1 and 14–2 has been shown at points 46–1 and 6–2, so that closure of either contact 50–1 or 50–2 ill shunt all the protection devices in the respective rotection circuits which are subsequent to the points 6–1 and 46–2. It will be obvious to those skilled in the rt that under certain circumstances it may be desirable locate the shunting conductor connection at a differ- nt point in the protection circuit or to provide means hereby the point of connection may be selectively aried. For this reason, supplementary conductors 8–1 and 18–2 are shown connected to circuits 14–1 nd 14–2 by way of switches 47–1 and 47–2, respec- vely. The closure of either of these switches 47–1, 7–2 while the protection control switches 32–1 and 2–2 are in the "protection-on" conditions will have e effect of including the associated protection ele- ents 36–1, 36–2 in the shunted portion of the circuits. lso, it will be understood by those skilled in the art at the electromechanical relays shown at various oints in the drawings may be replaced by electronic evices wherever desired.

While the invention hsa been described in connec- on with specific embodiments thereof and in specific ses, various modifications thereof will occur to those illed in the art without departing from the spirit and ope of the invention as set forth in the appended laims.

What is claimed is:

1. Apparatus for increasing the security of an electri- al protection system in which a protected location is onductively coupled to a central station which com- rises at least two conductive means for coupling said rotected location to said central station, at said central station, a first supervisory circuit and a second supervisory circuit, each supervisory circuit including a source of supervisory current coupled to a corresponding one of said conductive means and current-sensitive means coupled to said corresponding conductive means to detect predetermined changes in supervisory current therein, and at said protected location, a first protection circuit and a second protection circuit respectively corresponding to said first and second supervisory circuits at said central station, wherein each protection circuit is provided with an input terminal, a shunt terminal and an output terminal, and wherein at least one of said protection circuits is provided with at least one detection device connected between said input terminal and said output terminal so that operation of said detection device alters the flow of supervisory current in said protection circuit, means for connecting the input terminal of each of said protection circuits to a corresponding one of said conductive means to couple each protection circuit to a corresponding supervisory circuit at said central station, so that supervisory current is directed to each protection circuit, a ground point, switching means interposed between said ground point and said output terminals of said first and second protection circuits, said switching means including:

first relay means and second relay means respectively corresponding to said first and second protection circuits, wherein each of said relay means is provided with a winding having first and second terminals, an armature, and a contact, means for connecting the second terminal of each relay means to said ground point, means for connecting the armature of each relay to the first terminal of the winding of the other relay, two first conductor means for connecting the output terminals of said first and second protection circuits to said respective first terminals of said windings of said corresponding first and second relay means, and two second conductor means for connecting the shunt terminals of each of said first and second protection circuits to said contacts of said second and first relay means, respectively, wherein each of said shunt terminals is located in said respective first and second protection circuits at a point selected to shunt a predetermined portion of the respective protection circuit in response to the energizing of the relay means corresponding to the other protection circuit.

2. The method of detecting attempts to compromise an electrical protection system including a central station connected to a protected location by at least two conductors, at least two protection circuits at said protected location, and at least two supervisory circuits at said central station individually connected to supply separate supervisory current to each of two corresponding protection circuits by means of two of said conductors, which comprises the step of:

shunting a portion of either of said protection circuits in response to a predetermined change in supervisory current in the other one of said protection circuits so that a predetermined change in supervisory current in either one of said protection circuits is accompanied by a selected change in supervisory current in the other one of said protection circuits.

3. An electrical protection system in which a protected location is conductively coupled to a central station which comprises:

first conductive means and second conductive means for coupling said protected location to said central station, at said central station, a first supervisory circuit and a second supervisory circuit corresponding to said first and second conductive means, wherein each supervisory circuit includes a source of supervisory current coupled to said corresponding conductive means and current-sensitive means coupled to said corresponding conductive means to detect predetermined changes in said supervisory current therein, and at said protected location, a first protection circuit and a second protection circuit respectively coupled to said first and second conductive means to carry supervisory current supplied by said corresponding supervisory circuit to a ground point, and switching means interposed between said ground point and said first and second protection circuits for shunting a portion of either of said protection circuits in response to a predetermined change in supervisory current in the other one of said protection circuits so that a predetermined change in supervisory current in either one of said protection circuits is accompanied by a change in supervisory current in the other one of said protection circuits.

4. Apparatus as defined in claim 3 wherein said first protection circuit comprises at least two current-adjusting resistors so that said switching means shunts one of said current-adusting resistors in response to said predetermined change in supervisory current in the other one of said protection circuits.

5. Apparatus as defined in claim 3 wherein said second protection circuit comprises at least one detection device so that operation of said detection device alters said supervisory current carried by said first protection circuit.

6. Apparatus as defined in claim 3 wherein each of said first and second protection circuits includes at least one detection device so that operation of said detection device in either one of said protection circuits alters said supervisory current carried by the protection circuit including said operated detection device.

7. Apparatus as defined in claim 3 wherein said switching means comprises:

a first relay means including an armature, a contact, and a winding with an input terminal and a ground terminal, a second relay means including an armature, a contact, and a winding with an input terminal and a ground terminal, means for connecting said armature of said first relay means to the input terminal of said winding of said second relay means, means for connecting said armature of said second relay to said input terminal of said winding of said first relay means, and means for connecting said ground terminals of said windings of said first and second relay means to said ground point.

*8. Apparatus as defined in claim 1 wherein at least one of said first and second protection circuits includes at least one additional shunt terminal beyond that connected by the second conductor means to the contact of the relay means, and wherein said apparatus further includes*

*switch means corresponding in number to the number of said additional shunt terminals, each of said switch means having a first and second terminal,*

*third conductor means for connecting the first terminal of each of said switch means to one of said additional shunt terminals, and*

*fourth conductor means for connecting the second terminal of each of said switch means to the second conductor means connected to the shunt terminal of the protection circuit which contains the additional shunt terminal to which the first terminal of the switch is connected by said third conductor means,*

*whereby the elements of either of the protection circuits included in the shunted portion of the protection circuits can be varied.*

*9. Apparatus as defined in claim 8 wherein the first and second protection circuits each include at least one additional shunt terminal.*

*10. Apparatus as defined in claim 3 further including means for varying the portion of either of the protection circuits which is shunted.*

*11. Method as defined in claim 2 further including varying the portion of either of the protection circuits which is shunted.*

* * * * *